(12) United States Patent
Rigby et al.

(10) Patent No.: US 6,365,122 B1
(45) Date of Patent: Apr. 2, 2002

(54) PROCESS FOR MANUFACTURING POTASSIUM SULFATE FERTILIZER AND OTHER METAL SULFATES

(75) Inventors: William J. Rigby, 701 Burning Tree La., Naperville, IL (US) 60563; Keith D. Cochran, Killen; Timothy G. Holt, Florence, both of AL (US)

(73) Assignee: William J. Rigby, Naperville, IL (US)

( * ) Notice: Subject to any disclaimer, the term of this patent is extended or adjusted under 35 U.S.C. 154(b) by 0 days.

(21) Appl. No.: 09/100,994

(22) Filed: Jun. 22, 1998

(51) Int. Cl.$^7$ .............................. C01D 5/00; C01F 5/40; C01F 11/46; C01B 7/01; C01B 7/19
(52) U.S. Cl. ..................... 423/551; 423/552; 423/554; 423/555; 423/481; 423/483; 71/63
(58) Field of Search .................. 423/155, 179, 423/481, 483, 520, 544, 551, 552, 554, 555, 267, 499; 210/20; 71/63; 422/140, 145, 147

(56) References Cited

U.S. PATENT DOCUMENTS 1,500,289 A * 7/1924 Weber ........................ 423/482
1,937,885 A * 12/1933 Gitzen et al. ................ 423/465
3,563,701 A * 2/1971 Cannon ....................... 423/552
3,717,440 A * 2/1973 Cannon ....................... 422/140

OTHER PUBLICATIONS

In Re Edwards (No. 6147), 109 USPQ 380, 232 F, 2d 641, CCPA 884, 1956, Apr. 18, 1956.*

* cited by examiner

Primary Examiner—Steven P. Griffin
Assistant Examiner—Eileen E. Nave
(74) Attorney, Agent, or Firm—Emrich & Dithmar (57) ABSTRACT

A new process of preparing potassium sulfate fertilizer and other metal sulfates from the chlorides and other halides of these metals. The process utilizes the discovery that sulfur dioxide or trioxide, when introduced as a fluidizing medium into shallow beds of the halide salts at moderately elevated temperatures (1000° F.–1150° F.) in a counter current process results in the conversion of the metal halides into metal sulfates and the halide gas. The process is carried out in a series of true fluidized beds preferably but not necessarily arranged in a vertical configuration so that the solids flow downward due to the fluidized process and the sulfur dioxide or trioxide gases flow counter currently in an upward direction producing pure metal sulfates at the bottom and pure halide gas at the top.

17 Claims, 3 Drawing Sheets

PROCESS FOR MANUFACTURING POTASSIUM SULFATE FERTILIZER AND OTHER METAL SULFATES

FIELD OF THE INVENTION

This invention relates to a process for the reaction of metal chlorides with sulfur dioxide and/or sulfur trioxide gas in a truly fluidized state, with the production of a solid having a composition composed of the metal and one or more constituents of the sulfur dioxide or trioxide and a gaseous acid. More particularly, the invention relates to the production of potassium sulfate fertilizer and hydrochloric acid using sulfur dioxide or sulfur trioxide gas and potassium chloride in an energy efficient and non aqueous medium using counter current flow and true fluidized bed technology. The unique aspects of this process is that it permits the reaction to take place at a very rapid rate (minutes versus days) at moderately elevated temperatures while retaining essentially the same crystal size and screen analysis as the original potassium chloride. The counter current aspects of the invention permit the production of high purity potassium sulfate and a hydrochloric acid gas essentially free of sulfur dioxide.

BACKGROUND OF THE INVENTION

Potassium is one of three essential elements (N.P.K.) in the life cycle of all plants. Fertilizers therefore generally contain all three in one form or another. Potassium, however is generally present as a chloride since it is the most readily available, least expensive potassium compound. For many crops (e.g., citrus, tobacco) a fertilizer containing small amounts of chlorides is toxic. Thus, there is created a sizable demand for manufactured potassium sulfate as a non chloride source of potassium. However, it must be produced at a relatively low cost to compete with existing processes such as that produced from natural deposits and brines. Potassium sulfate is not known to occur in nature except as a double salt "$K_2SO_4 \cdot 2MgSO_4$", (langbeinite), which is mined and sold as such. While the magnesium is a desirable micronutrient, the proportion present in the langbeinite 15.25% reduces its desirability as a substitute for potassium chloride.

In addition langbeinite generally occurs with interstitial sodium chloride "NaCl" and requires careful washing and size control to produce a product of ninety five percent langbeinite. Pure potassium sulfate can be produced from langbeinite by reaction with potassium chloride:

$$K_2SO_4 \cdot 2MgSO_4 + 4KCl \rightarrow 3K_2SO_4 + 2MgCl_2$$

However, the process requires dissolution of the solid followed by evaporation and crystallization to recover potassium sulfate. Control of the process is difficult and the product produced is borderline in purity and particle size.

Hargreaves, et. al taught in U.S. Pat. No. 149,859, Apr. 24, 1874, that sodium and potassium chloride could be converted to the sulfate salts and hydrochloric acid by contacting the chloride salts with sulfuric acid made by a process similar to the old chamber process involving oxidation of sulfurous acid with air and water vapor by increasing the rate of conversion of sulfurous acid to sulfuric acid by the addition of niter or nitric acid. The conversion of the chlorides was accomplished in a rather crude vessel by forcing or inducting the sulfuric acid vapor through a fixed bed of the alkali salts until conversion was complete. Heat was added to the air, sulfurous acid and water before, during, and after mixing to elevate (superheat) the gases and acid vapors. Many processes utilizing this fundamental reaction have been proposed. A number of these use the term "fluidized bed" to describe spouting beds similar to those produced in "Wurster" type apparatus, or to describe a "dense phase gas agitated bed in a state of substantial fluidity" or to describe "an allutriated zone", or to describe gas conveyed or entrained solids. While these may fall under the generic term "fluidized" they are not true or conventional fluidized beds. "In a true fluidized bed particles are kept in a randomly moving, fluidized condition by a stream of pressurized gas. This is usually accomplished by placing the particles on a perforated support usually a metal plate or screen. A pressurized gas is forced through the perforations in the plate and causes the particles to fluidize. True fluidization is characterized by the particles moving in a random turbulent fashion similar to a gently boiling liquid". (See Darrah et. al. U.S. Pat. No. 5,399,186 Mar. 21 1995 column 4, line 44). In Nguyen U.S. Pat. No. 4,495,163 Jan. 22, 1985 column 3, line 34, the author found it necessary to define fluidized beds generically as follows to distinguish his process. "The term fluidized bed as used herein is intended to include conventional fluid beds, fast moving fluid transport systems wherein the pellets are carried in the gas stream separated and returned to a point of introduction, spouting beds, etc". It is important to emphasize this distinction since true or conventional fluidization causes the solids to flow and act like liquids. True fluidization as used in the instant invention is that which meets the definition outlined in the Darrah patent, which permits the use of counter current gas and solid flows, which results in the production of high purity potassium sulfate and hydrochloric acid, retention of crystal integrity, rapid conversion rates, simplicity of the apparatus, very efficient energy conservation and the elimination of environmentally controlled emissions, and excludes sporting beds, dense phase gas agitated beds, allutriated zones or fast moving transport systems since using such means other than that described as conventional or true fluidization will not accomplish the results described.

DESCRIPTION OF THE RELATED ART

The Potash Company of America used the Hargreaves process to produce potassium sulfate from potassium chloride utilizing sulfur dioxide in a small plant at Dumas, Tex., now shut down as commercially unprofitable. This process required the compaction of approximately 1 ounce of pulverized 100 mesh potassium chloride into oval shaped briquettes approximately 2 inches long by ¾ inches thick, which are dried in a gas fired rotary dryer, screened, and stored prior to loading into a conversion chamber. The plant contained 8 conversion chambers which were brick lined pits 16 feet square and 14 feet deep to a floor of cast iron grates on which approximately 50 tons of briquettes were distributed. The chambers were covered by a 1 piece insulated steel cover. Seven of the chambers were maintained in operation while one was being unloaded and reloaded with new briquettes.

Heavy 24 inch piping connected the chambers in series so that the sulfur dioxides gas produced by burning sulfur in the presence of air and water vapor entered the bottom of each chamber and left at the top at a diagonally opposite corner. The chamber in operation the longest (the first chamber) received the strongest gas, while the newly charged chamber received the weakest sulfur dioxide gas. The first chamber in the series was unloaded and reloaded each day so that 7 chambers were in operation at any one time. The second chamber then became the first in the series, the new chamber the last with the intermediate chambers moving up in place in the series. The process had to be shut down each day to connect the newly charged chamber and remove the oldest chamber for unloading. Piping had to be rerouted to accommodate this charging and unloading process. Briquettes unloaded from the chamber were crushed and screened, providing a significant amount of fines. Considerable energy was also used to dry the compacted briquettes, which were formed from wetted potassium chloride. Hydrochloric acid, produced by the reaction, was sold as a commercial grade.

Aside from the inefficiency associated with daily shut down and start up of the process, it is also obvious from the description of this process that it was very labor intensive and inefficient in this respect. The integrity of the initial potassium chloride crystals was also lost because of the mechanical grinding prior to briquette compaction and following conversion which resulted in uncontrolled production of fines. In addition, incomplete penetration of the gas to the center of the briquette often left unreacted KCL which contaminated the finished product. Also because of the significant pressure drop between chambers, blowers were spaced throughout the series to maintain gas flow. These blowers were subjected to hot hydrochloric acid and sulfur dioxide gases resulting in high maintenance requirement both for interconnecting piping and blowers. The instant invention by means of simplicity and the use of truly fluidized bed techniques eliminates all of the foregoing disadvantages and inefficiencies and results in a product of superior granular quality and product purity.

Lippman et al, in U.S. Pat. No. 2,336,180 disclose a process for manufacturing alkali metal sulfates by dispersing or injecting a cloud of finely divided alkali metal chlorides into a moving stream of sulfur dioxide, oxygen (air) and water vapor at reaction temperatures of approximately 1400° F. to 1550° F. There are many inherent disadvantages to this process, among them being the use of "chloride dust" as feed material so as to accelerate the reaction rate and hopefully result in complete reaction in the time permitted in the moving gas stream. High temperatures in the range of 1550° F. are required for complete reaction for particles in the range of 63% through 100 mesh and 35% through 200 mesh which is very fine particulate distribution. Obviously, very fine feed material will result in very fine or powdered finished product, which is commercially undesirable. Temperatures as high as 2000° F. or higher are required if the particles are more coarse. If more desirable lower reaction temperatures are required a catalyst (an impurity) of iron oxide (0.5%) is added. Since the alkali metal chlorides are injected into the moving gas stream the flow of gas and particles are concurrent except at the point of injection where some momentary counter current flow possibly exists due to gravitational pull on the particles, and which is almost immediately followed by capture of the particles in the moving gas stream. There is very little time therefore for complete reaction to occur and furthermore as the gas and particles proceed concurrently up the tower the sulfur dioxide concentration gradient between the gas and the particle diminishes due to adsorption of $SO_2$ on the surface of the particles, desorption of SO2 from the gas stream, and the addition of hydrochloric acid gas to the gas stream. This process by its very nature thus increases the possibility of unreacted halide remaining in the center of the particle.

In addition, as stated in the patent "the cloud of products evolved from the top of the furnace comprises essentially sodium sulfate, hydrogen chloride, nitrogen, residual oxygen with small amounts of sulfur dioxide sulfur trioxide and unconverted salt." Expensive gas separation methods must be employed to recover $SO_2/SO_3$ free hydrochloric acid and the finished sulfate product will be contaminated with chlorides and possibly iron if it is used as a catalyst. The recovered muriatic acid will also be contaminated with dissolved SO2 (sulfurous acid) and SO3 (sulfuric acid). Since SO2 is not readily soluble an air pollution hazard is also possible from unabsorbed SO2.

Cannon in U.S. Pat. No. 2,706,144 teaches a method for making sulfate salts and hydrochloric acid by reacting sodium, potassium, calcium chlorides in a deep (20 ft) dense bed agitated by a gas stream containing sulfur dioxide, air, and water vapor passing upwardly through the bed. Conversion of the chloride to sulfate takes place on the particle surface and is ostensibly abraided off by the agitation of the particles. The sulfate product is a very fine dust which is entrained in the upward moving gas stream. Cannon describes two processes, a continuous and batch operation both producing this very fine sulfate, which because of this characteristic, has limited commercial demand. The batch operation depicts cyclone separators as being required to recover this fine dust whereas in the continuous operation cyclones are not indicated and separation of the fine dust occurs by gravity in a reduced diameter central tube.

Since the gas velocity in the large diameter outside disperse phase is conveying this dust into a much smaller central tube the gas velocity in this smaller diameter tube and in the tubing exiting the apparatus will be significantly increased, thus causing a significant amount of the sulfate to be entrained in the gas and entrapped in the salt preheater or as a contaminant in the hydrochloric acid. Sulfate entrapped in the preheater will be reintroduced into the dense phase and again contacted by the reacting gases and subject to reaction (4, column 1, ln 46) introducing a possible impurity in the finished product. The final sulfate product does not retain the size integrity of the original metal chloride, the fine dust produced by the process description is significantly more fine than the original 120 mesh feed which is itself quite fine. Another significant disadvantage for both processes is that the $SO_2$ concentration gradient between gas and solid decreases upwardly through the column increasing the probability of $SO_2$ contamination of the hydrochloric acid, or the environment if the $SO_2$ is not absorbed in the acid. This is very likely to be a serious problem in the batchwise operation since the bed height decreases as the reaction proceeds and the $SO_2$ concentration gradient between the solid and gases also decreases. Energy efficiency is decreased due to the necessity to preheat the salt feed particularly during start-up of both processes. A further disadvantage is the time required to produce sulfate product which the process description indicates as taking hours to complete the reaction.

Cannon also discloses in U.S. Pat. No. 2,706,145 a method of converting chlorides of a metal selected from the group consisting of sodium, potassium, and calcium to a metal sulfate selected from the group consisting of sodium, potassium, calcium and hydrochloric acid. This Cannon process requires the use of vaporized sulfuric acid heated to high temperatures in a deep (15 to 20 feet) dense agitated bed to produce by abrasion a fine dust of metal sulfate. This process is subject to the same deficiencies as those previously outlined in U.S. Pat. No. 2,706,144. Furthermore, this process is energy inefficient due to the large quantity of heat required to preheat the metal chlorides and vaporize the sulfuric acid. Serious corrosion problems also exist due to the corrosive nature of hot sulfuric acid vapors.

Cannon in U.S. Pat. No. 3,563,701 teaches a method of producing metal sulfates and volatile acid gases by reacting salt particles containing the significant element of the acid gas with a spray of sulfuric acid in a reaction zone maintained at high temperatures. As indicated in the "Background of the Invention" section of this patent column 1, line 49, the author emphasizes a basic weakness in his prior teachings, as outlined previously, namely the production of "excessively dusty" fines. This current patent addresses this issue by employing a spouting suspended bed of salt particles transported in extremely hot gases (1600° F. to 2000° F.) and into which sulfuric acid liquid and vapor is sprayed in a concurrent fashion. Conversion to the sulfate occurs in the brief residence time in the reactor. Agglomeration of a percentage of the particles does occur because of the extreme temperatures employed in the presence of liquid sulfuric acid. However, since there is no means to reinject unreacted particles back into the reaction zone as in a Wurster type apparatus, unreacted salt particles and small sulfate particles gravitate into the product discharge line. Spargers are installed in three locations to elutriate these particles back into the reaction zone. Since the velocities in this zone are very high and turbulent it is suspected that particles suspended in the elutriating air are carried up into the area where the hot gas jet has expanded into the full diameter of the vessel and are then conveyed by the reaction gases out of the reactor and recovered by the cyclones together with unreacted fine chloride and sulfate carried up from the reaction zone. These chloride contaminated fines have little commercial value and must be recycled to the reactor. The process description is silent respecting the percentage which this recycle contributes to the feed however because of the brief reaction time a significant percentage of the feed is likely to be unreacted, partially reacted or only partially agglomerated. This could constitute a high recycle rate and a diminished efficiency.

It is also suspected that contamination of the fines and the product hydrochloric acid by sulfuric acid also exists. The process description calls for stoichiometric proportions of sulfuric acid and salt feeds into the reaction zone (column 5 line 30–34) whereas it also states that the reaction may be essentially carried out to completion with 93 to 98 percent stoichiometric yields. This means that 2 to 7% of the stoichiometric amount of sulfuric acid and potassium chloride do not end up as a constituent of the sulfate product, therefore they must end in the hydrochloric acid product or as a contaminant in the sulfate salt. This contamination would seriously reduce the commercial value of the finished products.

The apparatus is complex, containing small passages, subject to plugging unless stringent process controls are employed (preventing salt from softening/melting etc.) The apparatus is subject to extremely corrosive conditions (hot sulfuric acid vapors and liquids mixed with gases at 1600° F. to 2000° F.) Finally large amounts of heat are required to sustain the operation by preheating the feed salt, the entraining gases (1600° F. to 2000° F.) and vaporizing and preheating liquid acids thus substantially adding to cost of manufacture.

Cannon in a subsequent U.S. Pat. No. 3,717,440 simply claims the apparatus used in the previously described art.

Potassium sulfate is also recovered from saline lakes or seas (e.g., Great Salt Lake). Concentration of salts in some of these brines has been so affected by rainfall that production was suspended at Great Salt Lake, Utah in the past for a considerable period of time. In addition, precipitation and separation of the compounds particularly KCl and NaCl has created technical problems. While significant amounts of potassium sulfate are produced from these brines, the operation is not particularly efficient, since considerable processing and energy is required to recover the potassium sulfate from the other compounds.

Baniel et al. discloses in U.S. Pat. No. 2,902,341 a process for the preparation of water soluble metal sulfates, phosphates, or nitrates by the reaction in aqueous medium of the chlorides of the respective metals with free sulfuric phosphoric or nitric acid, respectively. Hydrochloric acid is extracted from the aqueous liquid with a solvent of limited mutual miscibility with water but being a solvent for hydrochloric acid but not for any of the metal salts. While this process has been exploited commercially, it lacks the simplicity and efficiency of the instant method. Large volumes of liquids must be handled; crystallization, extraction, separation, and distillation processes are required to recover the desired salts and solvents. Volatile organic solvents are utilized in the extraction process requiring stringent environmental and safety standards. The major plant utilizing this process has suffered serious fires, disrupting production for significant periods of time.

Numerous method have been taught involving recovery of potassium sulfate and other sulfates from solutions of mixed salts involving the addition of various metal alkali or sulfate salts or solution of these salts to modify the concentration and precipitate the desired products from these solutions. These processes are complex, requiring precise control of temperatures and concentrations and involve handling and recirculating large quantities of liquids. Sokolov et al., U.S. Pat. No. 4,215,100; Lampert et al. in U.S. Pat. No. 5,529,764; Efraim et al. in U.S. Pat. No. 5,552,126; Zisner in U.S. Pat. No. 5,549,876 and Neitzel et al. in U.S. Pat. No. 4,129,642; all teach processes of this nature.

Others teach methods of producing potassium sulfate by reacting sulfuric acid with potassium chloride to produce potassium acid sulfate and/or potassium sulfate. Worthington et. al in U.S. Pat. No. 4,588,573; Iwashita et. al in U.S. Pat. No. 4,342,737; Sardisco et al. in U.S. Pat. No. 4,045,543 and Myazaki in U.S. Pat. No. 4,436,710 all teach processes of this nature which require precipitation and recovery of the desired solids from the mother liquid and recirculation or evaporation of the remaining filtrate. These processes all require high energy input, many unit processes and circulation of large quantities of liquids.

Still other methods, Vajna et al., U.S. Pat. No. 4,707,347 teach recovery of potassium sulfate through ion-exchange wherein a saturated potassium chloride solution is intensively contacted with a sulfate laden anion resin to which the chloride ion is attached and the sulfate released to produce a solution of potassium sulfate from which crystals of potassium sulfate are recovered, the depleted anion exchanger being regenerated by intensive contact with magnesium sulfate solution producing a solution of magnesium chloride.

Sardisco, et al. U.S. Pat. No. 4,268,492 outline a process for the production of alkali metal sulfates from the reaction of alkali metal chlorides and sulfuric acid by way of the reaction of sulfuric acid with alkali metal fluosilicate to produce the alkali metal sulfates and fluosilicic acid $H_2SIF_6$ which reacts with the alkali metal chloride to produce hydrochloric acid and alkali metal fluosilicate.

All of the processes outlined in the prior discussion lack the simplicity, energy, and operating efficiency of the instant invention from which the finished product retains essentially the same size distribution and purity of the original solid feeds. The reaction proceeds rapidly and to completion. No external heat source is required and the process is continuous with halides being fed in the top bed and sulfates extracted from the bottom; true fluidization and gravity providing the means by which the product flows from bed to bed while counter current flow of gas (the fluidizing medium) permits the strongest sulfur dioxide gas stream to contact the most nearly converted feed while the most dilute gas contacts the raw feed thus eliminating contamination of the effluent hydrochloric acid gaseous product by the $SO_2$ or $SO_3$ gas.

SUMMARY OF THE INVENTION

The primary object of this invention is to eliminate the problems and inefficiencies of the prior art by providing a new process by which metal halides may be reacted with acid gases to produce dry solid compounds containing the acid gas cation while liberating a gaseous acid (or oxide) containing the metal cation.

A further object of this invention is to provide a new highly energy efficient process for said reactions.

A further object of this invention is to provide a new simple and cost effective process for the manufacture of said compounds.

A further object of this invention is to provide the conditions whereby the new method may be effectively performed to produce the said reactions.

A further object of this invention is to provide a granular product consisting of approximately the same mesh size as the initial solids which may be readily blended with existing products or which may be further granulated to permit coating with a slow release coating.

A further object of the invention is to provide a cost effective method to produce a high quality potassium sulfate fertilizer.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE PREFERRED EMBODIMENT

Figure 1:
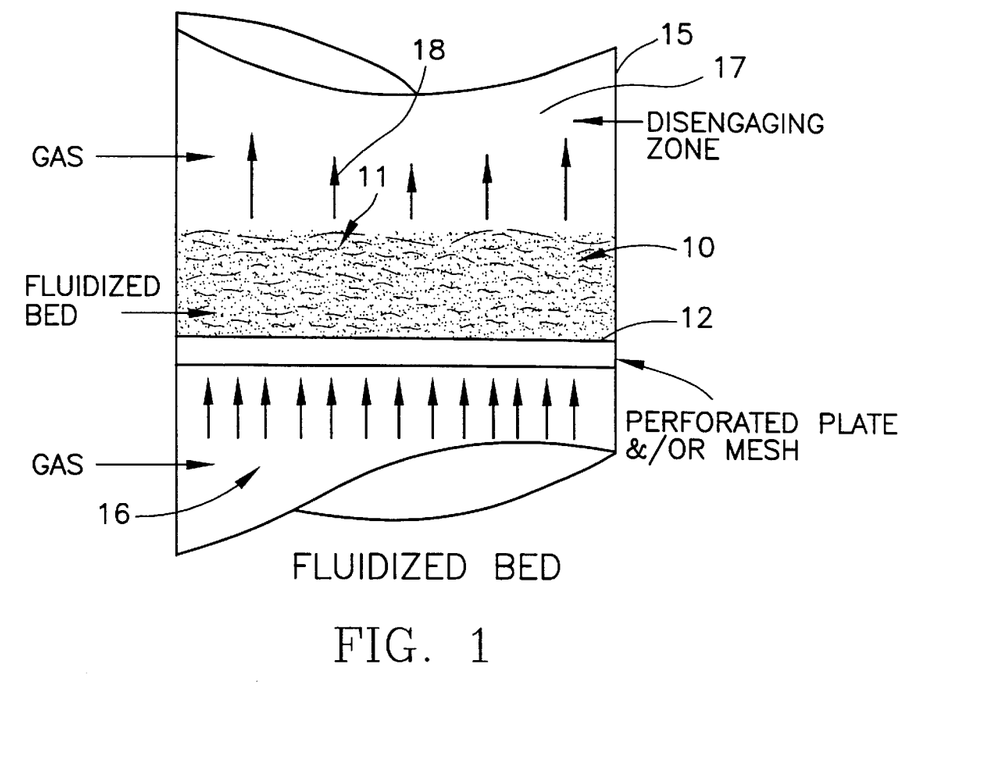
FIG. 1 is a elevational representation of a fluidized bed.

Referring now to FIG. 1, there is disclosed a fluidized bed 10 comprised of a plurality of particulates 11 suspended above a perforated plate 12 in a container 15. The container 15 is shown as a representation of a cylindrical pipe but may be of any desired shape. The container 15 is provided with a inlet gas 16 below the perforated plate 12 and a gas outlet 18 above a disengaging zone 17. The disengaging zone 17 is the area above the perforated plate 12 necessary for any particulates entrained in the gas flowing through the perforated plate 12 to fall back into the fluidized bed 10.

A fluidized bed, as defined in Kearlns ed., McGraw Hill 1976, is defined as solid particles kept in a randomly moving, suspended and moderately agitated condition by a stream of pressurized gas distributed through the bed so that the particles flow in a manner similar to a gently boiling liquid. This is usually accomplished by placing the particles on a perforated plate and a pressurized gas is forced through the perforations in the plate and the gas causes the particles to fluidize. Fluidized bed technology is well known in the art.

Figure 2:
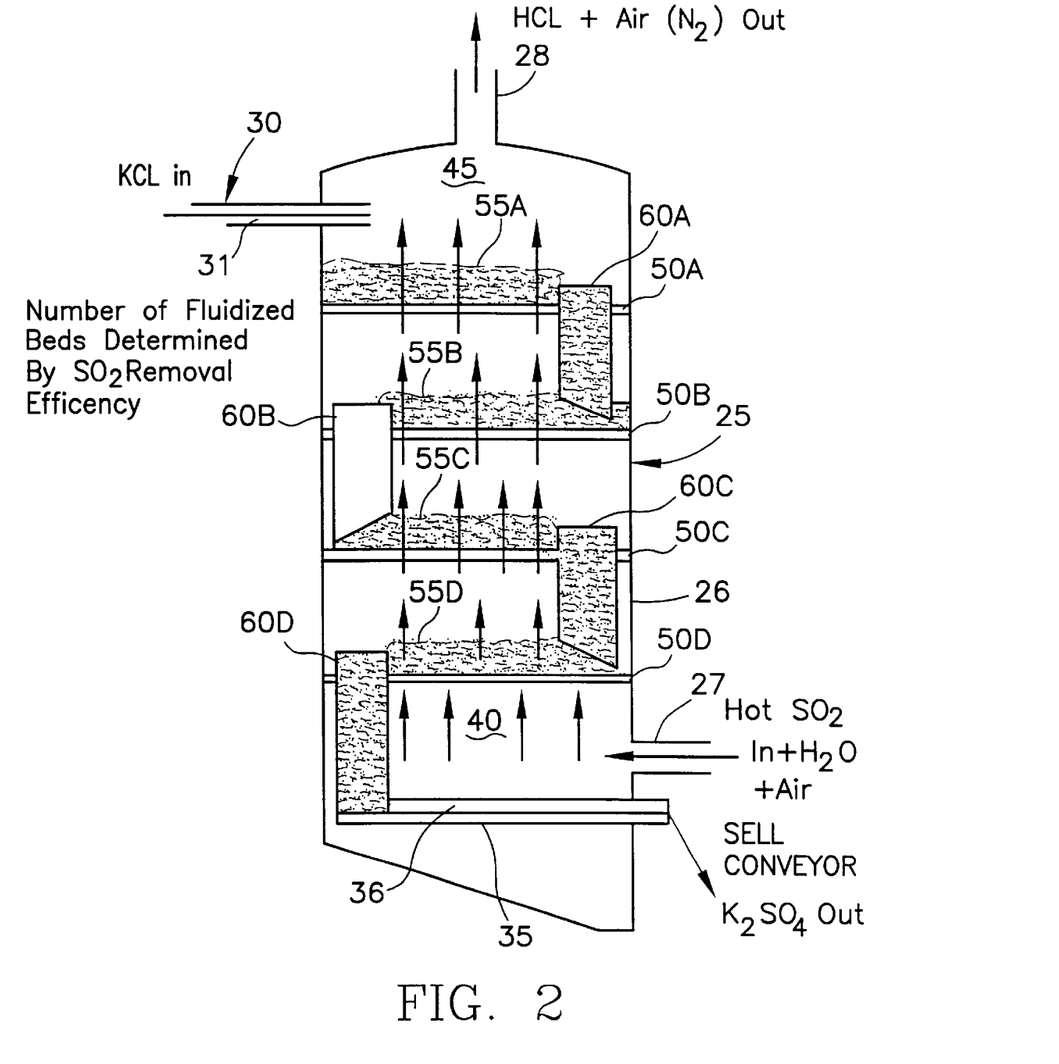
FIG. 2 is a side elevational view of fluidized beds arranged in vertical configuration.

Referring now to FIG. 2, there is another embodiment of the present invention in which a plurality of beds are arranged in vertical configuration. More particularly, a reactor 25 includes a cylindrical vessel 26 having a gas inlet 27 and a gas outlet 28. A particulate inlet conduit 30 houses an inlet screw mechanism 31 and a particulate outset 35 houses a product screw mechanism 36. The particulate inlet conduit 30 is positioned near the top of the reactor 25 and the particulate outlet conduit 35 is positioned near the bottom of the reactor 25.

The reactor 25 includes a hot gas plenum 40 in communication with the gas inlet 27 and an exhaust gas plenum 45 in communication with the gas outlet 28.

There are a plurality of perforated plates 50A, 50B, 50C and 50D, each of which support a corresponding fluidized bed 55A, 55B, 55C, 55D thereupon comprising a plurality of particulates in a state of fluidization due to the gas entering through the gas; inlet 27 and distributed through the hot gas plenum 40 and thereafter through the individual perforated plates, as shown in FIG. 2. Each of the fluidized beds 55A through D is provided with a particulate overflow conduit 60A–D which communicates particulates from each of the fluidized beds to the next adjacent downwardly positioned bed. For instance, conduit 60A communicates particulates from bed 55A to bed 55B and conduit 60B provides communication of particulates from bed 55B to 55C and so on. The particulate overflow conduit 60D provides communication between the bed 55D and the particulate outlet conduit 35. While the reactor 25 includes internal overflow conduits 60A–D, external conduits can also be employed.

As will be hereinafter described, hot gas containing sulfur oxide in water vapor and air is introduced through the inlet 27 and flows upwardly at a sufficient pressure to fluidize the beds 55D through 55A. As may be understood, the sulfur oxide concentration in the inlet gas is at its highest value since chemical reactions in each bed with halide particulates reduces the concentration of sulfur oxide in the gas while increasing the concentration of sulfate in the particulates until in the upper most bed 55A, the concentration of the sulfur oxide in the gas flowing therethrough is at the lowest such that the sulfur oxide concentration in the exhaust gas plenum 45 is substantially reduced to low enough levels such that it may be exhausted to the atmosphere without any further treatment or at the most very little treatment while the sulfate concentration in the bed 55D is at the greatest as most if not all of the halide has been converted to the corresponding sulfate.

Although the figure shows the use of potassium chloride particulates flowing into the bed 55A through the particulate inlet 30 and potassium sulfate flowing out of the bed 55D through the particulate outlet conduit 35, this is for purposes of illustration only. It should be understood that the halides may be any one or a mixture of chlorine, bromine or fluorine and the metal may be any one of potassium, sodium, calcium, or mixtures thereof.

Figure 3:
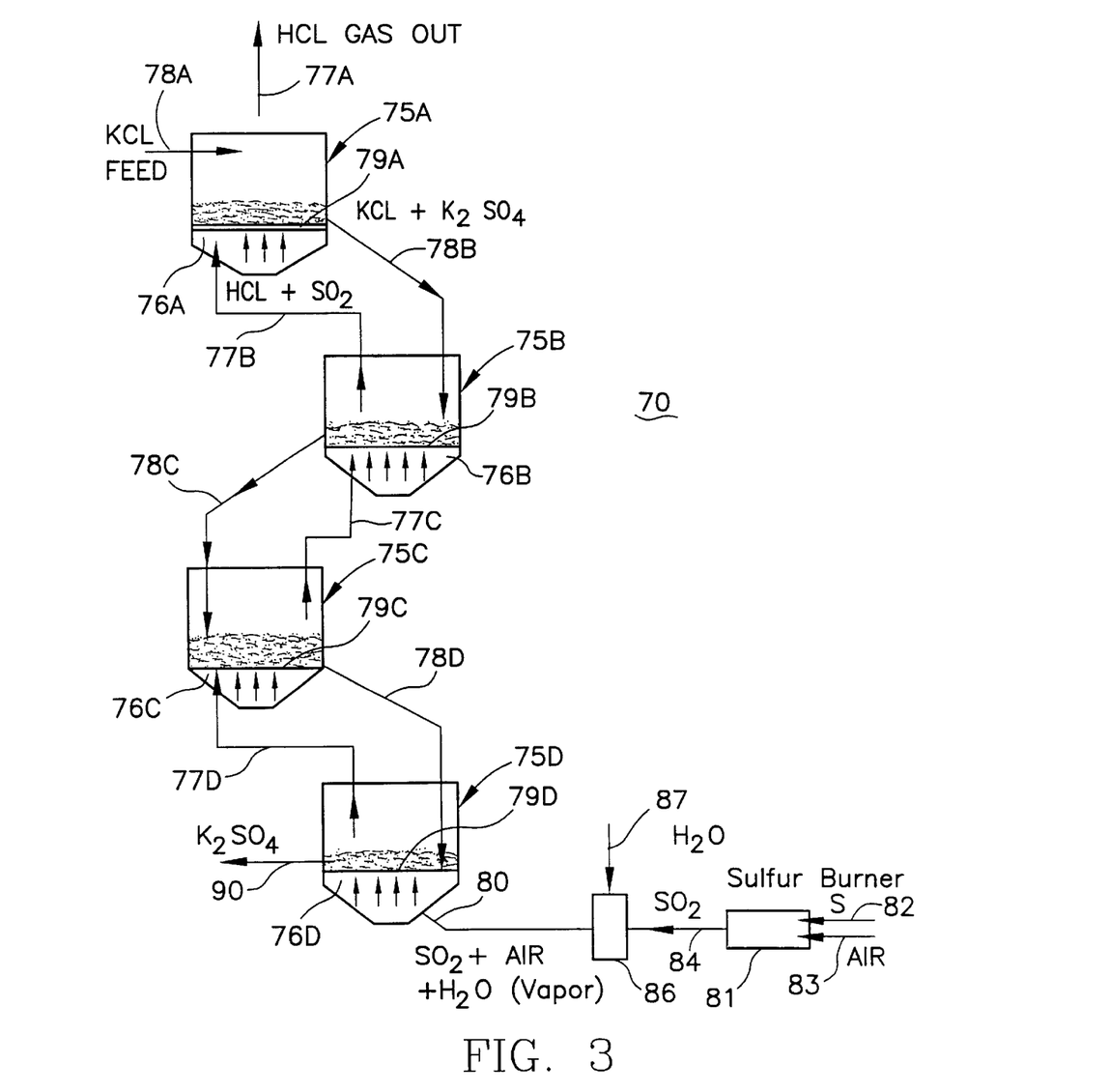
FIG. 3 is a schematic representation of a number of fluidized beds arranged in series connection.

Referring now to FIG. 3, there is shown in diagrammatic representation, a system 70 comprised of a plurality of reactors 75A, 75B, 75C and 75D, each connected by gas and particulate conduits as will be described. More particularly, there is provided in each reactor 75A–D, a corresponding gas inlet plenum 76A–D, a gas outlet plenum 77A–D and a solids inlet 78A–D. The flow of materials is the same for system 70 as previously described with respect to the reactor 25 but in the system 70, there are a number of discrete reactors rather than a single vessel as previously described.

More particularly, the system 70 includes a gas inlet 80 in communication with the gas inlet plenum 76D of reactor 75D. The gas inlet 80 is in communication with a sulfur burner 81 which is connected to a source of sulfur 82 and source of air 83. The sulfur and air are burned in the burner 81 and sulfur oxide shown as $SO_2$ but may include some $SO_3$ is transported through conduit 84 from the burner 81. The sulfur oxide flows to a humidifier 86 in which is provided water in the form of water vapor 87 to humidify the sulfur oxide containing gas which is then pumped through the gas inlet conduit 80 to the plenum 76D for flow through the various perforated plates 79A–D in each of the reactors to form the corresponding fluidized bed in each of the reactors 75A–D. The product outlet 90 removes the formed sulfate from the reactor 75D whereas the gas outlet 77A conducts the hydrochloric acid gas out of the endmost reactor.

It is also possible to employ a horizontal vessel with a series of discrete fluidized bed compartments to accomplish the reaction since the fluidization of the beds will permit counter current flow of gas and solids.

As can be seen therefore, there are a variety of apparatus and systems which can accommodate the present reaction but in all cases, it is desirable to have the particulates flow countercurrent to the fluidizing gas and for the concentration of sulfur oxide to diminish as the gas flows through successive beds while the concentration of metal sulfate increases as particulates flow in countercurrent relationship to the gas flow.

The present invention is directed to a method of producing potassium sulfate salts of high quality for fertilizer or other commercial use. The invention is based on the surprising discovery that acid gases in contact with shallow beds of a conventional or truly fluidized metal halide can rapidly convert without significant particle size degradation the solid particulate alkali to solid compounds consisting of the anion of the metal and the cation of the acid gas, while liberating an acid or acid gas including the cation of the metal. By shallow beds I mean a bed having a depth of about one to four feet. This new method allows a heretofore unknown energy and cost efficient method for producing said compounds.

The instant method consists of contacting sulfur dioxide or trioxide with wet or dry potassium or sodium chloride in the presence of air and water vapor at a moderately elevated temperature in a series of shallow fluidized beds. Conversion of 97% to 100% metal sulfates are achieved in a very short period of time, i.e. from severed minutes to one to two hours depending on the temperature of the gas and fluidized solids and concentration of $SO_2$ and $SO_3$ in the gas, with the liberation of hydrochloric acid gas.

Having described the basic concepts of the instant invention reference is made to the following examples which are provided to illustrate but not limit the preferred method of the invention and other similar methods of producing metal sulfates.

EXAMPLE 1

The preferred embodiment of the instant invention is to introduce hot sulfur dioxide gas, air and water vapor, preferably at a temperature in the range of 1000° F. to 1150° F. into a series of shallow beds, one to four feet deep, of a metal halide such as potassium chloride. The sulfur dioxide is preferably produced by burning elemental sulfur with air in a standard sulfur burner. Water is introduced into the hot sulfur dioxide gas stream as a fine water spray in sufficient quantity to satisfy the reaction requirements. Sulfur dioxide concentration and temperature are controlled by the ratio of air to sulfur in the burner. Commercially available sulfur burners are capable of producing $SO_2$ gas in the range of 5 to 18% $SO_2$ with gas temperatures in the range of 1300° F. to 1850° F. Higher temperatures and gas concentrations are possible by control of excess air. The higher the $SO_2$ concentration is maintained, the higher the gas temperature and the more rapid the reaction rate. Lower temperatures in the range of 1200° F. are more desirable since there is less corrosion, possible salt fusion, and agglomeration of the particles. However, at this temperature the reaction rate is increased to several hours. This is not a significant impediment with more than one bed, proper reactor design as is known to one skilled in the art, variable bed depths as previously described, and true fluidization, continuous production rates of ten or more tons per hour can be maintained even though residence time of solids in the reactor is; as much as two hours.

The apparatus may consist of a vertical column containing a number of perforated plates, connected to each other either by internal or external sealed overflows. The hot sulfur combustion gases and water vapor are fed into the bottom of the column below the bottom perforated plate. Solid metal chloride is introduced on a continuous basis into the top plate. The depth of the bed is controlled by the height of the overflow above the perforated plate. The solids because of true fluidization behave like a liquid and flow down the overflows into the next lower plate. This process continues until the solids reach the last plate from which they flow into a conveyor. At each plate gas and solids are intimately contacted due to the boiling action caused by the fluidization of the solids. A head differential exists between the inlet and exit location at each plate resulting in the flow of the solids from inlet to exit. The maximum concentration differential between the $SO_4$ in the solids and gas $SO_2$ is maintained as the solids flow down the reactor, and the gas proceeds upward. This is due to the depletion of the $SO_2$ in the gas stream as it reacts with the metal halides which are converted to sulfates. At the bottom plate the maximum $SO_2$ concentration gas contacts a solid totally or almost totally converted to the sulfate. The high concentration $SO_2$ results in liberation of the remaining halide and conversion of the remaining metal halide to metal sulfate. At the top several plates gas almost depleted of $SO_2$ contacts pure metal halide and leaves the reactor depleted of $SO_2$. The pure hydrochloric acid gas produced in the sequential fluidized reaction zones is carried out of the reaction column by the residual air gases and absorbed in water. The effluent gas from the absorption process is environmentally acceptable since it contains no $SO_2$ or HCl.

In an experiment designed to determine the $SO_2$ concentration in the reactor effluent, $SO_2$ was introduced into the bottom plate of a ten plate reactor, each plate of which contained ½ pound of potassium chloride. The solids were retained on each plate for the 15 minute duration of the test. The $SO_2$ passed through each plate fluidizing the potassium chloride until the concentration of the potassium sulfate in the top plate was one percent $K_2SO_4$. The gases exiting the upper plate were passed through three separate absorbers containing NaOH solution which were analyzed for sulfates and bisulfate. Insignificant amounts were present indicating almost total reaction of the $SO_2$ with the halide. Calculations based on the weight of $SO_2$ added and the potassium sulfate produced in all ten beds confirmed this finding. This experiment shows that even with a one percent sulfate concentration and dilute $SO_2$ gas, the $SO_2$ will almost completely react with the halide when the solids and gas are intimately contacted in a fluidized state and at reaction temperatures. Thus when a low concentration $SO_2$ gas contacts a pure metal halide, or one with a low sulfate concentration complete absorption and reaction is to be expected under similar operating conditions, i.e. under true fluidizing conditions and moderately elevated temperatures (1000° F. to 1100° F.).

capacity of ten tons per hour. Potassium chloride has a bulk density of 71 to 75 pounds per cubic foot, thus each plate must hold 5000 pounds or 70 to 67 cubic feet. If the bed depth is 1.5 feet the diameter of the column will be 7.7 feet which is not an exceptionally large diameter vessel.

The instant process also allows retention of essentially the same particle size distribution as illustrated in Table III. The reaction of the $SO_2$ with the halide and subsequent conversion to the sulfate is exothermic. It is suspected that release

TABLE I

| Plate # | Top Plate #1 | #2 | #3 | #4 | #5 | #6 | #7 | #8 | #9 | Bottom Plate #10 |
|---|---|---|---|---|---|---|---|---|---|---|
| % Conversion to $K_2SO_4$ | 1.0% | 7.0 | 12.0 | 10.0 | 18.0 | 17.0 | 26.7 | 20.0 | 27.3 | 35.0 |
| Lbs of $SO_2$ in solids | .002 | .014 | .022 | .019 | .033 | .031 | .049 | .037 | .041 | .064 |

Total lbs of $SO_2$ fed to reactor 0.3090 lbs as determined by flow meter total lbs of $SO_2$ in solids 0.312 lbs as determined by analysis. Total lbs of $SO_2$ in Sparger 0.0006 lbs or 0.19% of feed.

Single bed operation showed that about 160 to 170 minutes were required for complete conversion of the potassium chloride to potassium sulfate. Air, $SO_2$ and water vapor were introduced into the bed which was supported on a perforated plate and which was truly fluidized. Samples were extracted every ten minutes and analyzed. The following is illustrative of the results and confirms the time required for conversion.

of this, heat causes some overheating of the particle surface with resultant minor agglomeration of some particles as can be seen from examination of the diagram. A tighter particle size distribution is obviously a commercial advantage. Microscopic examination shows that even though minor particle agglomeration does occur the crystal sizing remains basically unaltered.

TABLE II

Run #2-20 2/20/97

| Exposure Time (min.) | $SO_2$ Rate #/min. | $H_2O$ Rate #/min. | Air Temp. | Fluid Bed Temp. | Gas Exit Temp. | % $SO_4$ in Prod. | % $K_2SO_4$ in Prod. |
|---|---|---|---|---|---|---|---|
| 10 | 0.11 | 0.035 | 1041 | 1058 | 910 | 4.17 | 7.57 |
| 20 | 0.11 | 0.035 | 1069 | 1079 | 950 | 6.09 | 11.05 |
| 30 | 0.23 | 0.069 | 1098 | 1109 | 997 | 9.02 | 16.36 |
| 40 | 0.34 | 0.104 | 1123 | 1136 | 1040 | 11.21 | 20.34 |
| 50 | 0.34 | 0.104 | 4140 | 1149 | 1059 | 17.29 | 31.37 |
| 60 | 0.45 | 0.111 | 1157 | 1167 | 1083 | 22.68 | 41.60 |
| 70 | 0.45 | 0.111 | 1169 | 1179 | 1100 | 26.68 | 48.41 |
| 80 | 0.56 | 0.130 | 1176 | 1188 | 1116 | 34.36 | 62.33 |
| 90 | 0.56 | 0.130 | 1182 | 1197 | 1127 | 38.10 | 68.31 |
| 100 | 0.56 | 0.130 | 1187 | 1205 | 1136 | 38.70 | 70.21 |
| 110 | 0.56 | 0.130 | 1191 | 1212 | 1141 | 47.62 | 86.34 |
| 120 | 0.56 | 0.130 | 1193 | 1216 | 1143 | 50.39 | 91.42 |
| 130 | 0.56 | 0.130 | 1193 | 1217 | 1138 | 52.34 | 94.95 |
| 140 | 0.56 | 0.130 | 1193 | 1219 | 1140 | 51.39 | 93.23 |
| 150 | 0.56 | 0.130 | 1193 | 1221 | 1141 | 54.69 | 99.21 |

Batch size 5 lbs $K_2SO_4$ -32 + 60 mesh

Retention and contact times of two to two and one half hours are of little consequence in final plant design. For example, a plant capacity of ten tons per hour, 24 hours per day, 365 days per year, will produce approximately 87,600 tons per year, a significant annual production. The vessel producing the potassium sulfate, if equipped with ten fluidizing compartments holding 2.5 tons per plate or a total capacity of 25 tons, will with a 2.5 hour retention, have a

TABLE III

| | KCl | | K2SO4 | |
|---|---|---|---|---|
| Tyler Mesh | % Retained | Cum. % Retained | % Retained | Cumulative % |
| +20 | 0.04 | 0.04 | 2.38 | 2.38 |
| -20 +24 | 0.24 | 0.28 | 1.2 | 3.58 |

TABLE III-continued

|  | KCl | | K2SO4 | |
| --- | --- | --- | --- | --- |
| Tyler Mesh | % Retained | Cum. % Retained | % Retained | Cumulative % |
| −24 +32 | 7.56 | 7.84 | 21.2 | 24.78 |
| −32 +42 | 35.27 | 43.11 | 45.07 | 69.85 |
| −42 +60 | 41.52 | 84.63 | 24.59 | 94.44 |
| −60 +100 | 13.41 | 98.04 | 4.14 | 98.58 |
| −100 | 1.96 | | 1.43 | |

Feed consisted of commercial grade soluble potassium chloride.

It is important to note that it is not essential to the process that the apparatus be a vertical cylindrical column. A series of separate reactors, of any desired shape containing properly designed perforated plates stacked vertically and connected to permit flow of solids from the top vessel to the bottom and flow of gas from the bottom to the top, will accomplish the desired result. A horizontal reactor with a series of discrete fluidized compartments each connected to permit flow of solids from the first or top bed to the bottom or last bed and the flow of gas from the last or bottom bed to the first or top, will accomplish the desired result.

EXAMPLE 2

This example demonstrates an alternate but less preferable method for the instant invention. It requires the same raw materials and process equipment except that a catalyst is employed to convert the sulfur dioxide to sulfur trioxide, a more reactive gas. The catalyst employed in the tests was LP-110 manufactured by Monsanto Envirochem and is used primarily in the manufacture of sulfuric acid to convert $SO_2$ to $SO_3$. This is a Vanadium based catalyst and is sensitive to moisture and temperature. Temperature limitation is 760° F. which requires that a waste heat boiler or similar temperature reducing process be employed to cool the $SO_2$ entering the catalyst bed. Two stage conversion is generally required with intermediate cooling since the catalytic conversion is exothermic. Pre-drying of the combustion air is also required since the catalyst is moisture sensitive. This requires that moisture be added to the reaction gases, subsequent to catalytic conversion, since moisture is required to complete the reaction. The reaction rate is very rapid however precise control of temperature, both in the reaction mass and catalytic converter, is required. Conditions must be carefully controlled to prevent production of tripotassium hydrogen sulfate and other sulfated products most of which are very corrosive and have low melting points. Other methods of producing sulfur trioxide can be employed to accomplish the same results. The aspect of this method which is of significance is that sulfur trioxide can be substituted for sulfur dioxide in this process.

Installation of heat exchange equipment, e.g. waste heat boilers, catalytic converters with the attendant need for annual screening and replacement on a less frequent basis, and gas drying equipment, would all add significantly to the capital and operating costs of this variation of the process. However, the rapidity with which this process proceeds make it a viable though less preferable method.

EXAMPLE 3

A further example of the instant invention is to introduce either vaporized or atomized sulfuric acid into the fluidized bed of the metal alkali. This aspect of the invention is significantly less energy efficient than the preferred embodiment since it requires heating the fluidizing medium and the acid. The heat of combustion of sulfur to sulfur dioxide or to sulfur trioxide is lost during the manufacture of sulfuric acid as is the heat of dilution of sulfur trioxide to sulfuric acid. The equivalent amount of heat must be supplied in the method for the conversion to proceed. The only unique aspect of the current invention retained in this example of the process is the effective use and simplicity of true fluidization, and the retention of the original particle size and purity and the use of counter current flow to increase the percent conversion of the halide to the sulfate and thus the purity of the finished products.

While there has been disclosed what is considered to be the preferred embodiment of the present invention, it is understood that various changes in the details may be made without departing from the spirit, or sacrificing any of the advantages of the present invention.

What is claimed is:

1. A process for converting particulate metal halides selected from the group consisting of alkali metal halides and alkaline earth metal halides to corresponding sulfate or sulfates, comprising contacting the particulate metal halides with a fluidizing gas including sulfur dioxide, water vapor and air at a velocity sufficient to form a fluidized bed of the particulate metal halides, and maintaining the fluidized bed at a temperature in the range of from about 400° F. to about 1600° F. for a time sufficient to permit the particulate metal halides to be converted to the corresponding sulfate or sulfates while producing the corresponding halide gas or gases.

2. The process of claim 1, wherein the halide or halides of the particulate metal halides are selected from the group consisting of chlorides, fluorides, bromides and mixtures thereof.

3. The process of claim 1, wherein the metal or metals of the particulate metal halides are selected from the group consisting of potassium, sodium, calcium and mixtures thereof.

4. The process of claim 1, wherein the bed has a depth in the range of from about 12 inches to four feet.

5. The process of claim 4, wherein the fluidizing gas is maintained in contact with the particulate metal halides for a time sufficient to remove substantially all the sulfur containing gas from the fluidizing gas leaving the bed.

6. The process of claim 1, wherein the sulfur dioxide is produced by burning elemental sulfur.

7. The process of claim 1, wherein the fluidizing gas includes $SO_3$.

8. A process for converting particulate metal halides selected from the group consisting of alkali metal halides and alkaline earth metal halides to corresponding sulfate or sulfates, comprising establishing a series of fluidized beds of particulate metal halides by passing a fluidizing gas including sulfur dioxide, water vapor and air through the particulate metal halides at a velocity sufficient to establish and maintain the particulate metal halides fluidized, the fluidizing gas leaving one bed and flowing through another bed in the series of beds until the fluidizing gas leaving the last bed in the series of beds is substantially free of sulfur and particulates leaving the first bed in the series of beds being substantially free of halides.

9. The process of claim 8, wherein the particulates are transported from bed to bed in the series of beds.

10. The process of claim 9, wherein the fluidizing gas moves countercurrent to the direction of the transported particulates.

11. The process of claim 10, wherein the halide or halides of the particulate metal halides are selected from the group consisting of chlorides, fluorides, bromides and mixtures thereof and the metal or metals of the particulate metal halides are selected from the group consisting of potassium, sodium, calcium and mixtures thereof.

12. The process of claim 11, wherein each bed has a depth in the range of from about 12 inches to four feet.

13. The process of claim 8, wherein the sulfur in the fluidizing gas comes from burning elemental sulfur.

14. The process of claim 8, wherein the sulfur in the fluidizing gas includes $SO_3$.

15. The process of claim 8, wherein the beds are in a single vessel vertically arranged such that particulate material from one bed falls into a lower bed and gas exiting from a lower bed flows through a higher bed.

16. The process of claim 8, wherein the beds are vertically arranged such that particulates flow countercurrently to the fluidizing gas and the particulates with the highest halide content is contacted with gas having the lowest sulfur oxide content.

17. The process of claim 8, wherein the halide is chloride and the metal is potassium or calcium.

* * * * *

UNITED STATES PATENT AND TRADEMARK OFFICE
CERTIFICATE OF CORRECTION

PATENT NO. : 6,365,122 B1
DATED : April 2, 2002
INVENTOR(S) : William J. Rigby et al.

It is certified that error appears in the above-identified patent and that said Letters Patent is hereby corrected as shown below:

Column 14,
Line 44, after the word "all" delete "the";

Column 15,
Line 9, after the word "wherein" delete "the";
Line 11, after the word "wherein" delete "the".

Signed and Sealed this

Twenty-fourth Day of September, 2002

Attest:

JAMES E. ROGAN
Attesting Officer    Director of the United States Patent and Trademark Office